United States Patent [19]

Hunt et al.

[11] 4,257,719

[45] Mar. 24, 1981

[54] UNDERWATER PIPELINES

[75] Inventors: Kevin W. Hunt; Peter J. Taylor, both of Barrow-in-Furness, England

[73] Assignee: Vickers Limited, England

[21] Appl. No.: 897,126

[22] Filed: Apr. 17, 1978

[51] Int. Cl.³ .............................................. F16L 1/04
[52] U.S. Cl. ................................. 405/173; 29/421 E; 285/382
[58] Field of Search ............... 405/154, 158, 169, 173; 29/421 E; 138/89; 285/382, 382.4, 382.5

[56] References Cited

U.S. PATENT DOCUMENTS

| | | | |
|---|---|---|---|
| 2,367,206 | 1/1945 | Davis | 29/421 E |
| 3,572,768 | 3/1971 | James | 29/421 E X |
| 3,751,932 | 8/1973 | Matthews | 405/173 |
| 3,842,612 | 10/1974 | Arnold | 405/173 |
| 3,876,233 | 4/1975 | Schmedding et al. | 29/421 E X |
| 3,978,892 | 9/1976 | Scodino | 138/89 |

Primary Examiner—David H. Corbin
Attorney, Agent, or Firm—Larson, Taylor & Hinds

[57] ABSTRACT

A method of recovering an underwater pipe comprises inserting a recovery line attachment into the pipe, explosively deforming the pipe so that it is mechanically secured to the attachment, and bringing the pipe to the surface by means of a lifting line secured to the attachment. The attachment may include a body insertable into the end of the pipe and a portion having a generally conical surface so that it forms a water tight seal with the pipe when the pipe is explosively deformed into engagement with it.

4 Claims, 5 Drawing Figures

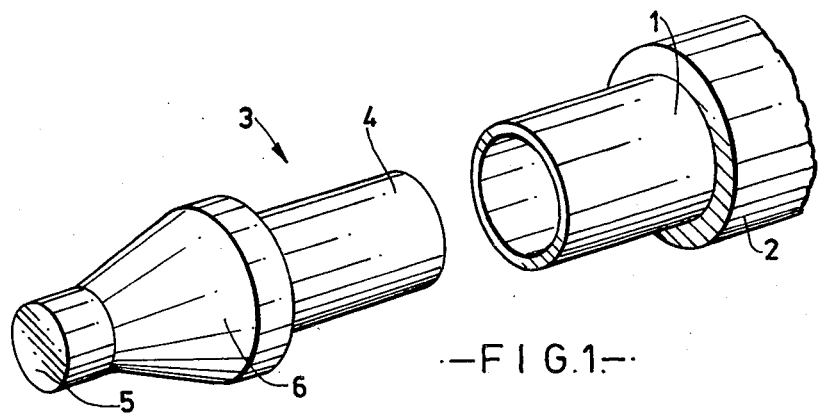
—F I G.1.—
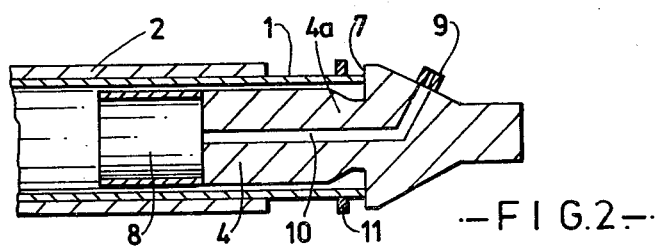
—F I G.2.—
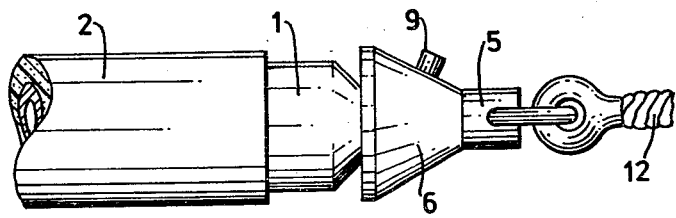
—F I G.3.—

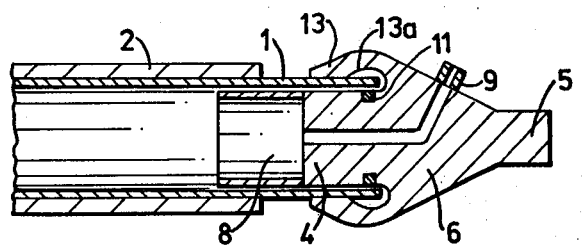
—FIG.4—
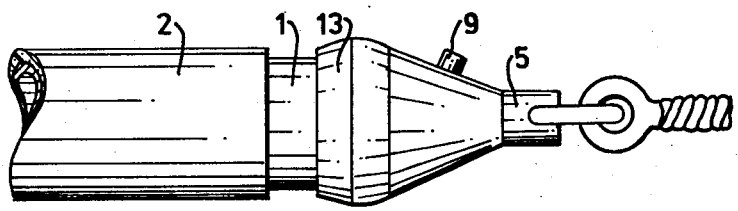
—FIG.5—

UNDERWATER PIPELINES

This invention relates to the recovery of underwater pipelines and more particularly, but not exclusively, to the recovery of liquid filled, possibly concrete encased, steel underwater pipe, which is being laid and which has become damaged during the laying process.

Conveniently, such pipes are layed from a lay barge and fracture of the portion of the pipe being fed into the water often produces a complex configuration of buckled pipeline on the seabed caused by the sudden release of tension in the pipe. It is necessary to bring the undamaged pipe to the surface before the laying operation may continue.

According to one aspect of the present invention there is provided a method of recovering an underwater pipe, which method comprises inserting a recovery line attachment into the pipe, explosively deforming the pipe so that it is mechanically secured to the attachment, attaching a lifting line to the attachment, and hauling on the line to bring the pipe to the surface.

According to another aspect of the present invention there is provided a recovery line attachment for use in recovery of an underwater pipe which attachment comprises:
(a) first and second ends,
(b) a body, at the first end, insertable into the end of the pipe
(c) a means of attaching a line to the attachment, and
(d) a portion having a generally conical surface and capable of forming a water tight seal with the pipe when the pipe is explosively deformed into engagement therewith.

In a particularly preferred embodiment, the recovery line attachment additionally includes a portion in the body for accommodating a pigging device (pig) and a conduit linking the pig-accommodating portion with a connector on a part of the attachment which is externally of the pipe in use. The portion for accommodating the pig can serve as a means for receiving and stopping the pig in the case where the dewatering of the pipe is effected from a land based installation. In this case, the aforementioned conduit allows the pipe to be vented and the attachment serves as a vent cap. Alternatively, in the case where the dewatering is to be effected from the seabed, the attachment may serve to launch a bi-directional pig in which case compressed air is introduced into said accommodating portion via the conduit to cause the pig to travel along the pipe, the mandrel serving as a hydrostatic seal for the pipe.

The generally conical surface may be an external surface of the attachment in which case the portion has a generally circular cross section which decreases as the distance from said first end of the attachment increases. Alternatively, the generally conical surface may be an internal surface of the attachment in which case the portion has a generally circular cross secton which increases in diameter with an increase in distance from said first end of the attachment.

For a better understanding of the invention and to show how the same may be carried into effect, reference will now be made, by way of example to the accompanying drawings in which:

FIG. 1 is a perspective view of a recovery line attachment and of the recovery end of a pipe, FIG. 2 is a cross section showing the attachment in position at the recovery end of the pipe prior to detonaton, FIG. 3 is a side view of the combination of FIG. 2 after detonation, FIG. 4 is a cross section similar to that of FIG. 2 but illustrating a second embodiment of recovery line attachment, and FIG. 5 is a side view of the combination of FIG. 4 after detonation.

Referring now to FIG. 1, there is shown the recovery end of an underwater pipeline comprising a pipe 1 covered with a conventional concrete/bitumen coating 2. The recovery end may have been prepared by marking off a length of undamaged pipe adjacent the damaged portion (conveniently employing a midget submarine or "submersible" for this purpose); removing the concrete coating of the pipe (by means of the submersible) to expose lengths of the pipe at the marked points; and cutting the pipe itself by means of explosive charges placed around the pipe by the submersible to sever the pipe length from the remainder. Next, holes are cut in the wall of the severed pipe length at the exposed pipe ends, again by means of explosives, and an expanding grapnel is inserted in each hole. Finally, a sling is attached to the grapnels and the severed pipe length is dragged clear of the lay path by means of a tug attached to the sling. Thereafter the submersible is employed to remove a further length of concrete from the recovery end of the pipe to obtain the recovery end as shown in FIG. 1.

FIG. 1 also illustrates a recovery line attachment in the form of a mandrel generally denoted by reference numeral 3 and comprising at its first end a cylindrical body 4 having an external diameter somewhat less than the internal diameter of the pipe 1 and, at its second end, a part 5 for the attachment of a heavy surface lifting line thereto. The mandrel also includes a head portion 6 having a generally annular portion 7 intended to abut against the end of the pipe 1 (see FIG. 2). That part 4a of the body 4 adjacent to the head 6 is generally conical and has a circular section the diameter of which decreases as the distance from the first end of the mandrel increases. The body portion 4 includes a chamber 8 for accommodating a pig, this chamber 8 being linked to an external air line connector 9 on the surface of the head 6 of the mandrel by means of a conduit 10. An explosive ring charge 11 is located on the external surface of that part of the pipe end adjacent to the conical portion 4a.

On detonation of the explosive 11, the pipe end is deformed inwardly against the conical portion 4a so that the mandrel is mechanically secured and sealed to the pipe end as shown in FIG. 3. During the explosive deformation of the pipe end, the conical portion 4a of the mandrel serves as an anvil and buckle arrestor in that it prevents pipe buckle propagation along the pipe due to the explosive pressure waves.

Thereafter, a heavy surface lifting line 12 is secured, preferably semi-automatically, to the line attachment means 5 so that the recovery end may be lifted to the surface, the mandrel serving as a pulling head.

In the case where the pipe is to be dewatered from the seabed, a pig, accommodated in portion 8, is launched along the pipe by connecting a source of compressed air to the connector 9, preferably semi-automatically.

Alternatively, if the pipe is to be dewatered from a land based installation, the conduit 10 serves as a vent, and the accommodating portion 8 serves as a pig stop.

Referring now to FIGS. 4 and 5, there is illustrated a further embodiment of recovery line attachment in accordance with the invention. In these Figures, parts corresponding to parts of FIGS. 1 to 3 are denoted by like reference numerals. In this case, the head portion 6 of the mandrel includes outer walls 13 spaced from the body 4 so as to leave an annular recess to accommodate the end of the pipe 1. The internal surface of the outer walls 13 includes a generally conical portion 13a having a generally circular diameter which increases with increased distance from the first end of the mandrel. In this case, the explosive ring charge is placed on the internal surface of the pipe 1 in the vicinity of the conical portion 13a. On detonation, the pipe end is deformed outwardly so as to be mechanically sealingly engaged against the conical portion 13a.

By means of the present invention pipelines may be recovered from normal saturation diving depths or even from deepers waters. Further the attachment may be deployed into the pipe end either by submarine or surface diver.

We claim:

1. A method of recovering an underwater pipe which method comprises inserting at least part of a recovery line attachment into an open end of the pipe, such that at least part of the attachment is radially disposed relative to the pipe wall adjacent said open end, locating an explosive charge at least closely adjacent a face of the pipe wall so as to lie generally radially opposite a portion of said attachment disposed adjacent the other face of said pipe wall, explosively deforming the pipe toward a portion of the attachment by detonating the explosive charge so that the pipe is mechanically secured and tightly sealed to the attachment, and bringing the pipe to the surface by hauling on a lifting line secured to the attachment.

2. A method as claimed in claim 1 wherein said portion toward which the pipe is deformed is a continuous surface portion inclined to the longitudinal axis of the pipe, and the pipe is explosively deformed toward and into sealing engagement with said inclined surface portion so as to preclude separation of the attachment and the pipe without deformation or destruction at least in part of the pipe or the attachment.

3. A method as claimed in claim 1 wherein the explosive charge is located adjacent the outer face of the pipe wall and the pipe is explosively deformed inwardly toward a portion of the attachment disposed inside the pipe.

4. A method as claimed in claim 1 wherein the explosive charge is located adjacent the inner face of the pipe wall and the pipe is explosively deformed outwardly toward a portion of the attachment disposed about said pipe end.

* * * * *